April 26, 1966  B. D. BARGER, JR., ETAL  3,248,316
COMBINATION PROCESS OF HYDROCRACKING AND ISOMERIZATION OF
HYDROCARBONS WITH THE ADDITION OF OLEFINS IN THE
ISOMERIZATION ZONE
Filed May 1, 1963

INVENTORS:
Bion D. Barger, Jr.
William W. Sanders
James F. Vanecek

United States Patent Office 3,248,316
Patented Apr. 26, 1966

3,248,316
COMBINATION PROCESS OF HYDROCRACKING AND ISOMERIZATION OF HYDROCARBONS WITH THE ADDITION OF OLEFINS IN THE ISOMERIZATION ZONE
Bion D. Barger, Jr., Chicago, William W. Sanders, Crete, and James F. Vanecek, Flossmoor, Ill., assignors to Standard Oil Company, Chicago, Ill., a corporation of Indiana
Filed May 1, 1963, Ser. No. 277,338
10 Claims. (Cl. 208—58)

This invention relates to a hydrocarbon conversion process and more particularly it relates to an improved combination process for converting hydrocarbons and especially a combination process in which hydrocracking and isomerization are employed in a particular manner to acheve a unique benefit.

The figure is a schematic illustration in flow diagram form of one embodiment of the present invention.

Heretofore, processes have been developed for converting olefins, such as normal pentenes, etc., to isoparaffins, such as isopentane, etc. Of particular interest are such known processes wherein a composite catalyst having balanced hydrogenation and isomerization activities is contacted with an olefinic hydrocarbon in the presence of hydrogen to produce a product containing more branched-paraffins than the paraffin isomer equilibrium amount. Such a composite isomerization-hydrogenation catalyst is balanced in favor of the olefin isomerization activity, i.e., the normal olefin isomerization is much faster than the hydrogenation reactions occurring in the process. Typically, the desired balance in catalyst activity is achieved with a catalyst comprising an active metallic hydrogenation component, a solid acidic component and an activity-control-affording agent. The balanced catalyst provides a rapid rate of isomerization relative to that of hydrogenation under the conditions of the process.

It has been found that when a normal olefin feed is reacted with hydrogen over an isomerization-hydrogenation catalyst balanced in favor of isomerization, disproportionation side reactions tend to occur. These side reactions lead to products having a number of carbon atoms which may be greater or less than that of the feed, and such side reaction products are generally undesirable. For example, when converting normal pentenes to isopentane, it may not be desirable to produce isobutane. Also, the formation of branched $C_6$'s and $C_7$'s may be objectionable because they are for the most part monomethyl substituted and have relatively low octane ratings.

According to the present invention the formation of side reaction products during the isomerization of normal olefins feeds is reduced significantly by carrying out the isomerization-hydrogenaton reaction in the presence of a hydrocracked hydrocarbon product containing an aromatic hydrocarbon or a mixture of aromatic hydrocarbons. Briefly, the present invention comprises a combination refining process for the production of light and heavy naphtha gasoline components as well as distillate fuels by contacting a light olefin hydrocarbon feed in a reaction zone with an active isomerization-hydrogenation composite catalyst in the presence of a hydrogen-affording gas under isomerization-hydrogenation conditions, wherein the contacting is carried out in the presence of at least a portion of a hydrocarbon product obtained by contacting a high boiling hydrocarbon feed in a hydrocracking zone with an active hydrocracking catalyst in the presence of an excess of a hydrogen-affording gas.

Hydrocracking is a general term and, as used herein, is applied to refining processes wherein hydrocarbon feed stocks of relatively high molecular weight are converted into mixtures of hydrocarbons of lower molecular weights, and wherein the conversion is carried out at elevated temperature and pressure in the presence of a hydrogen-affording gas. In hydrocracking, typically, hydrocarbon feeds such as catalytic cyclic oils and gas oils boiling in the range from about 350° F. to 1000° F. are hydrocracked to obtain gasoline boiling products and light distillates. Usually, the hydrocarbon feeds are first subjected to hydrodenitrogenation to substantially remove the nitrogen containing components in the feed. Hydrocracking is particularly suitable for certain feeds such as those containing appreciable amounts of aromatics. Accordingly, gasoline boiling and light distillate hydrocracked products typically contain, among other hydrocarbon materials, some aromatic and polycyclic aromatic materials.

Introduction of hydrocracked hydrocarbon product into the isomerization-hydrogenation reaction zone is particularly advantageous because aromatic hydrocarbons, especially polycyclic aromatic hydrocarbons which are present in the hydrocracked product, are effective to suppress disproportionation. The effect of the presence of aromatic hydrocarbons on the isomerization-hydrogenation reaction is quite pronounced and a benefit thus accrues to the isomerization-hydrogenation reaction by virtue of the presence of hydrocracked product in the isomerization-hydrogenation zone.

The combination of hydrocracking with an isomerization-hydrogenation process is further advantageous because the two processes have many requirements which are complementary. For example, the isomerization-hydrogenation reaction is highly exothermic and requires close temperature control. The presence of a substantial volume of hydrocracked product in the isomerization-hydrogenation reaction zone acts as a heat sink to absorb the exothermic heat of reaction and prevents rapid temperature rise thus permitting better reaction temperature control. The hydrocracked product remains relatively inert while in the isomerization-hydrogenation zone and further hydrocracking is kept to a minimum even when the isomerization-hydrogenation catalyst is identical with the catalyst employed during the hydrocracking step because the presence of olefins in large amounts, on the order of the concentrations present in the isomerization-hydrogenation zone, inhibits hydrocracking. Thus, the advantage of a readily available heat "quench" accrues to the isomerization-hydrogenation reaction without degradation of the previously hydrocracked product.

In addition to the aforementioned, other advantages are realized from the combination of the two present processes which are unavailable when either process is operated by itself. For example, the hydrocracking step operates in the presence of large excesses of hydrogen while the isomerization-hydrogenation reaction consumes very substantial amounts of hydrogen. The hydrogen, in the form of any one of a number of hydrogen-affording gases, consumed by isomerization-hydrogenation, can effectively and advantageously be employed as the excess of hydrogen-affording gas used in the hydrocracking zone prior to its consumption in the isomerization-hydrogenation zone. Furthermore, the hydrocracking reaction is typically carried out at temperatures elevated with respect to temperatures employed in the isomerization-hydrogenation zone. Therefore, it is possible to minimize heat transfer requirements for the combination process by transferring heat from the hot hydrocracked product to the cold olefin feed.

The presence of small amounts of olefinic materials in the hydrocracking reaction zone advantageously increases the rate of the hydrocracking reaction without adversely affecting product distribution. A portion of the isomerization-hydrogenation feed stock can be conveniently diverted to the hydrocracking zone for this purpose. In addition to the benefits accruing from promotion of the hydrocracking reaction rate, olefin injection in the hydrocracking zone is advantageous because olefins present therein are converted to high octane saturated branched chain hydrocarbons in a higher than equilibrium iso to normal paraffin ratio. These and other process and economical advantages, such as that to be derived from operating a single large reactor unit for the combined process instead of two smaller units, will be apparent from the detailed description which follows.

In a preferred embodiment, the present invention comprises contacting an olefinic feed with an active isomerization-hydrogenation composite catalyst in a reaction zone in the presence of a hydrogen-affording gas under elevated pressure and at a temperature in the range of about 400° F. to 800° F., said isomerization-hydrogenation catalyst comprising a hydrogenation component, an activity-control-affording agent and a solid acidic support, the catalyst activities being balanced in favor of olefin isomerization, and introducing into the isomerization-hydrogenation reaction zone at least a portion of a hydrocracked hydrocarbon product which provides from about 0.5 to about 40 volume percent, based on olefin feed, of polycyclic aromatic hydrocarbons effective to reduce formation of side reaction products. The hydrocracked hydrocarbon product is obtained by contacting a hydrocarbon feed boiling in the range of about 350–850° F. in a hydrocracking zone with a hydrocracking catalyst in the presence of an excess of a hydrogen-affording gas at hydrocracking conditions including a temperature in the range of about 450–800° F. and in the presence of an excess of a hydrogen-affording gas.

In the process of the present invention a selected high boiling hydrocarbon feed stock is introduced into the hydrocracking zone containing catalyst along with a hydrogen containing gas such as hydrogen gas, catalytic reformer make-gas or a recycled hydrogen-rich gas from the present process. The hydrocracking step may be operated in the liquid phase, the vapor phase or mixed vapor-liquid phase. The catalyst system may be of the fixed bed type, as well as a fluidized bed or other appropriate type of system. The feed stocks employed may be derived from petroleum, shale, gilsonite or other such sources. Also it may be desirable to recycle a portion of the hydrocracked effluent to the hydrocracking zone.

The feed stocks which may be satisfactorily hydrocracked in the present process may have a wide range of compositions and may contain large concentrations of saturates in addition to aromatics. Saturates are hydrocracked to gasoline-boiling-range paraffins containing a greater than equilibrium concentration of isoparaffins in the product, while in the case of polynuclear aromatics these are partially hydrogenated and the hydrogenated ring portion is hydrocracked to afford an alkyl substituted benzene and an isoparaffin. High boiling fractions of crude oil constitute advantageous feed stocks for the process of the invention. Most generally the feed stock will range from naphtha and keorsene through the light and heavy gas oils. The feed stock will normally boil above about 300° F. and may boil up to about 1000° F. Advantageously, the boiling range of the feed stock is about 300° F. to about 850° F. Examples of desirable feed stocks are light catalytic cycle oil having a boiling range of from about 350° F. to about 650° F., heavy catalytic cycle oil boiling in the range of about 500° F. to 850° F., virgin gas oil boiling from about 400° F. to 1000° F. and coker gas oil boiling in the range of about 350° F. to 800° F.

Product yields are especially dependent upon the nature of the feed stock, the process conditions and the catalyst employed in the process. In each instance it is necessary to correlate the aforementioned factors according to the desired product.

In previous hydrocracking processes sulfur in the system has been regarded as a catalyst poison, i.e., in that it undesirably reduces catalyst activity. Furthermore, the deposition of sulfidic deposits on the catalyst has presented problems in the regeneration of a deactivated catalyst due to the tendency to form sulfates on the catalysts and thereby further reduce catalyst activity. It has been found that the normal amounts of sulfur which are found in the above-described feed stocks do not adversely affect the catalyst employed in the present invention, either during the on-oil period, or during the regeneration of the catalyst.

Desirably, nitrogen and oxygen as components of compounds in the feed stock are kept as low as possible in order to maintain a desirably long cycle life; i.e., the period of time for which the catalyst remains effective in producing the desired product. With higher nitrogen contents in the feed stock more frequent regenerations and/or higher temperatures are required to maintain a suitable cycle life. Typically, the feed may contain less than about 0.01 weight percent nitrogen and when operating at temperatures of about 700° F. or lower it is desirable to maintain the nitrogen level at about 10–15 parts per million, and advantageously at less than 1 part per million.

Small amounts of light olefin hydrocarbons, typically $C_3$ to $C_8$ olefins and preferably $C_4$–$C_6$ olefins, may be added to the hydrocracking reaction zone to promote the hydrocracking reaction. These olefinic materials may suitably be derived from any available source but advantageously they are derived from the olefinic feed stock to the isomerization-hydrogenation zone. A detailed description of the feed stocks will be found hereafter in this specification. The amount of olefinic material added to the hydrocracking zone is critical and when the amount of olefin added is increased beyond the critical amount, the promotional effect is lost and inhibition of the hydrocracking reaction may follow. Typically a sufficient amount of light olefin hydrocarbons is added to provide in the hydrocracking zone an amount from about 0.3 to about 20 mole percent of light olefins based upon hydrocracking feed stock. These olefins can be added to the hydrocracking feed stock or they may be introduced to the hydrocracking reaction zone in a stagewise manner at multiple spaced apart injection points. By using multiple injection the total amount of olefins added to the hydrocracking reaction zone is increased without exceeding the critical range set forth above. Multiple injection permits maintaining the desired concentration of olefins throughout a substantial portion of the hydrocracking reaction zone.

The process conditions which are employed in the present invention can be selected over a relatively wide range and are correlated, according to the nature of the feed stock and of the particular catalyst employed, so as to produce a desired conversion, i.e., as the percentage of feed stock converted to products. Satisfactory conversions are obtained with the above described feed stocks at pressures in the range of about 200 to 2000 p.s.i.g. and temperatures in the range of about 400° F. to 1000° F., although pressures and temperatures outside of these ranges may be employed when utilizing certain feed stocks, particularly highly refractory feeds. Advantageously, pressures in the range of about 750 to 2000 p.s.i.g. and temperatures between about 500° F. and 800° F. are employed. However, pressures near the lower end of the broad range set out above (i.e., 200–2000 p.s.i.g.) may be advantageous for the combination process employing an isomerization-hydrogenation step which is preferably operated at lower pressures. It may be desirable during the course of a run to increase the temperature within the reaction zone as the catalyst deactivates in order to compensate for a drop in the catalyst activity. Thus, with a fresh or newly regenerated catalyst it may be desirable to come on stream at a temperature of about 500° F. and to gradually increase the operating temperature towards about 750° F. during the course of a run. In most instances it is desirable to maintain a low operating temperature, since higher temperatures have been found to result in increased coking and increased amounts of gas formation.

In space velocity, expressed herein as liquid hourly space velocity (L.H.S.V.), in terms of volumes of oil charged to the reaction zone per hour per volume of catalyst may range from about 0.1 to 10, normally from about 0.2 to 5, and preferably from about 0.25 to 2 L.H.S.V. Lower space velocities tend to increase the degree of conversion.

Hydrogen is consumed in the hydrocracking process and it is necessary to maintain an excess of hydrogen in the reaction zone. However, the process is relatively unaffected by changes in the hydrogen to oil ratio within the general range of operations. The hydrogen to oil ratio employed desirably is high enough to provide sufficient hydrogen for consumption during the isomerization-hydrogenation reaction and is in the range of about 1000 to 20,000 standard cubic feet of hydrogen gas per barrel of feed (s.c.f.b.) and advantageously about 2000 to 12,000 s.c.f.b. is employed.

It has been found that over wide ranges of opearting conditions the products of the hydrocracking process predominantly boil within the gasoline boiling range. The dry gas make, i.e., methane through propane, generally is less than about 5 weight percent and typically is in the order of about 2 to 3 weight percent. The butane-pentane fraction of the product also is low, with the amount produced being more dependent upon operating conditions and the nature of the feed stock. When employing a feed stock such as light catalytic cycle oil the pentane-plus to 400° F. fraction of the product generally will range upwardly from about 50 weight percent of the total converted product.

Typically, the aromatics content of the hydrocracked product will range from about 10 to about 40 volume percent. For example, a heavy catalytically cracked cycle oil hydrocracked in the presence of hydrogen and a hydrocracking catalyst at conditions which include a pressure of about 1500 p.s.i.g. and a temperature of about 600–620° F. contains about 30 volume percent aromatics.

The catalyst employed in the hydrocracking reaction step may be selected from the various well-known hydrocracking catalysts which, typically comprise a hydrogenation component and a solid acidic hydrocracking component. Preferably, the hydrocracking catalyst further comprises a minor amount of an activity control-affording material which effectively provides a desirable balance in the catalyst hydrogenation activity relative to the acidity during the overall conversion. Such catalysts having balanced activities have been found to be capable of providing a product of suitable characteristics, such as more highly branched paraffins and better product distribution. These activity control-affording elements are normally employed in relatively small amounts, depending upon the activity of the hydrogenation component relative to that of the acidic component, and are further described herein below.

The acidic cracking component of the hydrocracking catalyst may comprise one or more solid acidic components such as silica-alumina (naturally occurring and/or synthetic) silica-magnesia, silica-alumina-zirconia, and other similar refractory oxides. Also, acid-treated-aluminas, with or without halogens, such as fluorided alumina, boria-alumina, and the heteropoly-acid-treated aluminas, i.e., treated with phosphotungstic acid, phosphovanadic acid, silicotungstic acid, silico-molybdovanadic acid and the like, may be employed. However, it is critical that such materials possess substantial cracking activity in the finished catalyst composite. A preferred acidic component of the hydrocracking catalyst composition is one of the commercially available synthetic silica-alumina cracking catalysts which may contain about 5 to 40 weight percent alumina and which acidic component also contains fluorine as a constituent. Preferably, the acidic component of the catalyst is employed as a support and it is highly porous, having a surface area of between about 100 and 500 square meters per gram. The preparation and properties of the acidic cracking components are well known in the art and they need not be described further herein for the purpose of the present invention. For example, see the series entitled, "Catalysis" by Emmitt (Reinhold Publishing Corp.), particularly volume VII, pages 1–91.

Many of the well-known metallic hydrogenation catalysts may be incorporated in the hydrocracking catalyst, but preferably, the metal constituent of this component is selected from the metals of Group VIII of the Periodic Table which are known to possess satisfactory hydrogenation activities, especially nickel, platinum, cobalt and palladium, or from the metals of Group VI, especially tungsten and molybdenum. The hydrogenation component of the catalyst advantageously can be incorporated into the catalyst by impregnating a porous acidic cracking component with a heat-decomposable compound of the hydrogenation metal, followed by calcining to provide a composite. Typically, a silica-alumina cracking catalyst is impregnated with a solution of nickel acetate, chloroplatinic acid or the like, and then dried; followed by pelleting and calcining at an elevated temperature (about 1,000° F.).

However, it is contemplated that the finished catalyst may also be produced by various methods such as by cogelling the various components and by other well-known variations in catalyst preparation techniques to produce a finished catalyst having the desired properties.

The amount of the hydrogenation component incorporated in the hydrocracking catalyst can vary over a wide range, with the amount being selected to provide the desired catalyst activity. For example, large amounts of nickel, e.g., up to about 30 weight percent can be employed, and relatively small amounts of nickel, e.g., as little as about 0.1 weight percent is also effective, with about 0.5 to 10 weight percent nickel being preferred. Typically, about 0.1 to 2 weight percent platinum is effective in the catalyst and preferably about 0.1 to 1 weight percent platinum is employed. The amount of the hydrogenation component employed in the catalyst thus will depend upon the catalytic ability and economic factors.

Elements which have been found to be capable of providing an advantageous balance in activities between the metallic hydrogenation component and the solid acidic component include the normally solid elements of Group VIA of the Periodic Table, especially sulfur; the normally solid elements of Group VA of the Periodic Table, especially arsenic and antimony; and certain metals such as silver, lead, mercury, copper, zinc, and cadmium, although the effectiveness of each is not necessarily the same. These catalyst modifying elements typically are incorporated into the catalyst during the catalyst manufacture by impregnating a composite such as nickel on silica-alumina with a solution of an organic (including aryl and alkyl substituted organo-metallics) or inorganic (including the acids, ammonium salts, nitrates, halides, etc.) compound, such as triphenyl arsine, arsenic trioxide, triphenyl stibine, lead nitrate, silver nitrate or mercuric nitrate, and/or by treating with sulfur compounds, such as carbon disulfide and hydrogen sulfide, which may be present in the feed or in the hydrogen. Where the composite is impregnated with a liquid solution such as an organo-metallic compound of the desired element, the liquid is evaporated to leave a deposit on the base and the impregnated deposit is then treated with hydrogen at an elevated temperature, typically about 850° F., to reduce the catalyst. However, it is also contemplated that the above elements may be introduced into the reaction zone during the on-oil period or during other processing periods usch as during regeneration to contact the catalyst base in situ and thereby incorporate the element into the catalyst. As mentioned above, only small amounts of activity control-affording elements are generally required in the catalyst. Typically, about 0.1 to 5 atoms of arsenic or antimony, preferably 0.1 to 1 atom and optimally 0.25 to 0.75 atom of these elements per atom of the hydrogenation metal is employed. Likewise, about 0.03 to 5, preferably about 0.05 to 2, and optimally, about 0.1 to 1 atom of the metals such as silver, copper, lead or mercury per atom of the hydrogenation metal, is incorporated into the catalyst.

Among the benefits obtained from employing the above-mentioned balanced catalysts in the present process are the insured production of branched chain paraffins, more favorable control of catalyst activity and the simplification of catalyst reactivation techniques whereby a readily regenerable catalyst can be employed in the process.

For the isomerization-hydrogenation reaction an olefinic hydrocarbon stream, which may be a substantially pure olefin or a hydrocarbon mixture having substantial olefin content, preferably about 50 percent or more olefins, is selected as a feed. Refinery streams particularly suitable as feed stocks for the process are light olefinic naphthas boiling in the range from about 20° F. to about 350° F., and especially light thermal, coker or catalytic cracked naphthas containing substantial quantities of normal olefins having a carbon number distribution in the range of from about $C_4$ to $C_{10}$. Advantageously, a narrow cut of such naphthas containing substantial quantities of $C_4$–$C_7$ normal olefins, and most preferably a $C_4$–$C_6$ olefinic fraction is employed since this latter fraction is unusually well adapted as a feed for the process. The olefinic feed stock may be derived from petroleum, shale, gilsonite or other such organic materials.

The olefinic feed is introduced into the isomerization-hydrogenation reaction zone where it is contacted with the isomerization-hydrogenation catalyst in the presence of at least sufficient hydrogen for olefin saturation. The operation may be liquid phase, vapor phase, or a mixture a liquid-vapor phase. A hydrogen-rich gas such as substantially pure hydrogen, catalytic reformer make-gas or other gas streams containing available hydrogen for olefin saturation is introduced into the reaction zone with the feed. Advantageously, the hydrogen-affording gas stream is excess hydrogen-affording gas transferred to the isomerization-hydrogenation reaction zone from the hydrocracking zone wherein a high boiling hydrocarbon is converted to a lower boiling hydrocarbon product in the presence of a hydrocracking catalyst and excess hydrogen. Preferably, an excess of hydrogen is employed in the isomerization-hydrogenation step, which excess in practice will usually be at least about 1500 s.c.f. per barrel of olefinic feed. Larger excesses of hydrogen or inert gas may be employed to reduce olefin partial pressure in order to increase the iso to normal (i/n) paraffin ratio of the converted product.

The reaction zone is operated under conditions promoting the isomerization-hydrogenation of olefins to isoparaffins. A super-atmospheric pressure is employed, which pressure can range up to 3000 p.s.i.g. or more, but preferably is in the range of about 100 to 2000 p.s.i.g. An elevated temperature is employed in the catalyst bed, which temperature typically is in the range of about 400° F. to 800° F., and preferably is about 450° F. to 700° F. Catalyst activities, the nature of the material charged to the reaction zone, pressure and other operating variables will affect the selection of the operating temperature. Liquid hourly space velocities (L.H.S.V.) of from about 0.1 to 50 volumes of hydrocarbon (as liquid) per hour per volume of catalyst are employed, most generally about 0.1 to 10 L.H.S.V., and with a preferred rate being about 1 to 10 L.H.S.V.

In addition, the isomerization-hydrogenation reaction is carried out in the presence of at least a portion of the aromatics containing hydrocarbon product obtained by hydrocracking an aromatics-containing hydrocarbon feed.

The amount of hydrocracked product introduced into the isomerization-hydrogenation zone from the hydrocracking zone will vary according to the requirements of the isomerization-hydrogenation reaction. These requirements will change with variation in the nature of the olefinic feed stock, the particular catalyst employed, the reaction conditions and the nature of the product desired. Furthermore, the amount of hydrocracked product introduced into the isomerization-hydrogenation zone will depend upon the concentration of aromatic hydrocarbons present therein, and this concentration will in turn be affected by the nature of the feed to and the conditions present in the hydrocracking step. Typically, however, a sufficient amount of hydrocracked product will be introduced into the isomerization-hydrogenation reaction zone to provide from about 0.5 to about 40 volume percent, based upon olefin feed, of aromatic hydrocarbons effective to suppress disproportionation. For hydrocracked products with an aromatics content typically in the range of from about 10 to about 40 volume percent the amount of hydrocracked product added to the hydroisomerization zone will vary from 2 to about 80 volume percent based upon olefin feed.

The total amount of olefinic feed to the isomerization-hydrogenation reaction zone will vary over a wide range depending upon the nature of the feed stocks involved, the process conditions employed and the particular product or products desired. In order to take advantage of the various complementary process requirements such as minimization of heat transfer requirements and employment of hydrocracker hydrogen-gas in the isomerization-hydrogenation zone and to insure the presence of a sufficient volume of hydrocracked product to act as a heat sink in the isomerization-hydrogenation zone, it will typically be advantageous to employ a minor amount of olefinic hydrocarbon feed stock with respect to hydrocracker feed. Preferably, this amount will be from 10 to 50 volume percent.

The catalyst employed in the isomerization-hydrogenation step is a composite having a hydrogenation activity and an isomerization activity, and preferably, the catalyst activities are balanced in favor of olefin isomerization. The catalyst composite comprises a metallic hydrogenation component and a solid acidic component. Preferably, an activity-control-affording agent is incorporated in the catalyst to provide the desired balance in activities which result in a paraffinic product containing more branched paraffins than the paraffin isomer equilibrium amount.

The hydrogenation component comprises one or more of the known hydrogenation catalysts. Hydrogenation catalysts are well known and those found to be particularly useful are the metals, including the oxides and the sufides, of Group VIII of the Periodic Table, especially nickel, palladium, platinum, and cobalt. The amount of hydrogenation metal incorporated in the catalyst can vary over a wide range, with the amount being selected to provide the desired catalyst activity. For example, large amounts of nickel, e.g., up to about 30 weight percent can be employed, and as little as about 0.1 weight percent is also effective, with about 0.5 to 5 weight percent nickel being preferred. Typically, about 0.05 to 2 weight percent platinum is effective, and preferably about 0.1 to 1 weight percent platinum is generally preferred. In a preferred embodiment of the invention, such Group VIII hydrogenation catalysts are supported upon a solid acidic component, such as silica-alumina cracking catalyst base. While an impregnated type catalyst is preferred, other catalyst forms may be employed, such as a catalyst wherein the various components are co-precipitated from a sol. Advantageously, the hydrogenation component is incorporated into the catalyst by impregnating the solid acidic support with various solutions of the hydrogenation metal group, such as palladium chloride, chloroplatinic acid, nickel acetate, cobalt acetate, nickel nitrate, etc., followed by drying and calcining at elevated temperatures. Typically, the composite is dried for a suitable time at a temperature between about 250° F. and 400° F. followed by calcining for a suitable time at a temperature between about 800° F. and 1200° F.

In general, the solid acidic component of the isomerization-hydrogenation catalyst must provide sufficient acidity to promote the skeletal isomerization of straight chain olefins under the conditions of the process, and a high surface area material, typically having a surface area of about 100 to 500 square meters per gram, preferably is employed. On the other hand, the acidity should not be such as to promote the rapid isomerization of paraffins. The catalyst acidity relates to isomerization activity, and methods of measuring catalyst acidity are well known and need not be described herein. Various acidic catalyst materials are well known in the art, e.g., the acid treated clays and aluminas, and various mixtures of silica, alumina, magnesia, etc. Typically, the solid acidic components of the catalyst can be a naturally occurring mineral, such as montmorillonite clay, a synthetic silica-alumina, or a combination of these. Preferably, an artificial aluminosilicate, such as one of the commercially available silica-alumina cracking catalysts is utilized as a support. The alumina portion of the support may vary from about 5 to 40 weight percent. Both the commercially available "high alumina" silica-alumina catalyst containing about 20 to 30 weight percent $Al_2O_3$, and the "low-alumina" material containing about 10 to 15 weight percent $Al_2O_3$ have been found effective for this purpose.

Various activity-control-affording agents have been found to be effective in providing the desired activity balance in the catalysts. Agents found to be useful for this purpose include sulfur, arsenic, antimony and bismuth. Also, small amounts of metals such as copper, lead, silver and mercury have been found to be effective in providing the desired activity balance. The above agents may combine with the other catalyst components in various forms to produce a catalyst having the desired properties. For example, compounds, such as the sulfides or arsenides of the hydrogenation metal may be formed, or, the agents, such as lead, mercury, etc., may be alloyed with the hydrogenation metal. Generally speaking, about 0.1 to 5 atoms of the aforementioned activity-control-affording agents per atom of a Group VIII hydrogenation metal are suitable, and preferably, the atom ratio is between about 0.1 and 1.

Catalysts which have been found to be especially well suited for use in the present process are the arsenides and sulfides of the Group VIII metals, especially nickel, supported upon a silica-alumina cracking type catalyst.

Advantageously, the desired proportion of the activity-control-affording agent is incorporated in the catalyst during its manufacture. For example, a nickel on silica-alumina catalyst base can be impregnated with a solution of an organic or inorganic compound of the particular agent, the solvent evaporated and the compound reduced to leave a deposit on the base. Such solutions include the aryl or alkyl substituted organo-metallics, e.g., triphenyl arsine, or the acids, the nitrates, the halides, etc., of the above-mentioned elements. Such solutions as mentioned above also may be introduced into the reaction zone to contact the catalyst base in situ, as by additions to the feed charged to the reactor, and thereby incorporate the desired element into the catalyst.

In addition, the isomerization-hydrogenation catalyst employed may be one of the aforementioned hydrocracking catalysts and in one embodiment of the present invention the isomerization-hydrogenation catalyst and the hydrocracking catalyst are identical.

Reference is now made to the drawing which schematically illustrates the flow diagram of an embodiment of the present invention employing olefin injection in the hydrocracking reaction section. A narrow cut of $C_5$–$C_6$ light olefinic naphtha containing a substantial quantity of normal olefins and boiling in the range of from about 20° F. to about 350° F. is charged to the system at 20. Denitrogenated heavy catalytic cycle oil boiling in the range of about 500° F. to 850° F. enters the system at 1, and make-up hydrogen enters the system at 30. The cycle oil is picked up by pump 2 and passes through line 3 into heat exchanger 4 where it receives heat from the hot effluent in line 18 leaving reactor 11. Heat exchanged cycle oil then passes through line 7 into furnace 8 for preheating to hydrocracking reactor inlet temperature which is about 600° F.

The preheated oil is then charged through line 9 to reactor 11 which is a combination reactor having separate hydrocracking and isomerization-hydrogenation reaction zones. As illustrated, reactor 11 has five separate reaction sections, four of which, namely 12, 13, 14 and 16, comprise the hydrocracking zone; and the single reaction section 17 comprises the isomerization-hydrogenation zone. The total amount of hydrocracking catalyst is distributed over the four hydrocracking reaction sections in equal portions. The catalyst beds in each section are supported by a suitable grid structure permitting downflow of oil through the reactor from section to section. Although reactor 11 as illustrated has four equal hydrocracking reaction sections and a single isomerization-hydrogenation section, it is to be understood that different reactor designs may be employed in additional embodiments of the present invention. Depending upon the particular requirements of the process being carried out, it may be advantageous to employ an additional number of reaction sections in the isomerization-hydrogenation zone as well as to use a greater or lesser number of equal or unequal hydrocracking reaction sections. Further it may be advantageous to employ a design permitting use of a swing reactor technique to assist in catalyst regeneration. Also it may in some instances be advantageous to construction the hydrocracking zone and the isomerization-hydrogenation zone in separate vessels.

The catalyst in the hydrocracking reaction sections of the illustrated embodiment is a composite containing 9.4 weight percent nickel, 2.4 weight percent arsenic and 3.0 weight percent fluorine on a high alumina silica-alumina cracking catalyst (about 25 weight percent alumina). This composite is prepared by impregnating the silica-alumina cracking catalyst with an ammoniacal solution of nickel acetate tetrahydrate followed by drying at a high temperature (1000° F.) and calcining. A nickel-containing composite results which is then impregnated with a mixture of $As_2O_3$ in $H_2O_2$ and $NH_4F$ in water followed again by drying and calcining. Catalyst used in the isomerization-hydrogenation reaction section 17 is a sulfided 5 percent nickel on silica-alumina catalyst which is prepared by impregnating a silica-alumina cracking catalyst containing approximately 25 percent alumina with an aqueous nickel acetate solution followed by drying and calcining at 1000° F. The resulting composite is sulfided by pre-treatment with 8 percent hydrogen sulfide-hydrogen gas at 730° F.

Excess hydrogen-affording gas to be employed in the initial hydrocracking reaction section 12 enters reactor 11 through line 9 along with preheated hydrocracker feed. This hydrogen is made up of make-up hydrogen entering the system at 30 and recycle hydrogen taken overhead in line 32 from separator 31. These two hydrogen-affording gas streams are combined in line 33 and passed into line 3 with the hydrocracking feed. The remaining hydrocracking reaction sections each receive additional recycle hydrogen taken from separator 31 by means of lines 32, 34, 35, 36 and 37.

The light olefinic naphtha charge is passed directly to the isomerization-hydrogenation reaction section by means of pump 21 and line 22. A portion of this feed is diverted for injection into the hydrocracking reaction sections through line 23 and an equal amount of olefin is added to the hydrogen gas stream entering each hydrocracking reaction section through lines 24, 26, 27 and 28.

Inlet temperature to each of the hydrocracking reaction sections is 600° F., reaction pressure is 1000 p.s.i.g. and weight hourly space velocity is 2.6. In the hydrocracking reaction sections high boiling hydrocarbons are converted in the presence of olefin promoters to lower boiling hydrocarbons in a number of exothermic reactions as previously described. Accordingly, there is a temperature rise in each hydrocracking reaction section of about 50° F. Effluent leaving the first reaction section 12 at 650° F. is cooled down to 600° F. before entering section 13 by the combined recycle hydrogen-olefin injection stream 37. Effluent from each of the remaining hydrocracking sections is cooled in a similar manner prior to entering the succeeding hydrocracking reaction section.

Effluent from reactor section 16 is at a temperature of approximately 650° F. and may be essentially completely hydrocracked. This hot stream is then combined with cold isomerization-hydrogenation feed coming from line 22 for reaction in the isomerization-hydrogenation section 17. The isomerization-hydrogenation reaction takes place typically at a lower temperature than the hydrocracking reactions. Accordingly, a sufficient volume of hot hydrocracked product is provided to heat the isomerization-hydrogenation feed to a reactor inlet temperature of about 550° F. No heat exchange equipment is required to effect this heat transferred since the two streams involved are co-mingled for passing through the isomerization-hydrogenation reaction zone. The combined streams then pass into the isomerization-hydrogenation reaction section 17 where the pressure is 1000 p.s.i.g. and space velocity (L.H.S.V.) is 1 volume of oil per hour per volume of catalyst. In this zone normal olefins in the light naphtha charge stock are converted to a higher than equilibrium ratio of iso to normal paraffins as previously described, in the presence of previously hydrocracked product which contains aromatic hydrocarbons that suppress undesirable disproportionation side reactions. The reactions in the isomerization-hydrogenation reaction zone are highly exothermic so that ordinarily a quench is necessary to prevent runaway reaction temperatures. The large volume of hydrocracked product, however, has a quenching effect and its presence keeps temperature rise to about 90° F. so that reactor effluent temperature is an acceptably low 640° F. Therefore, the need for an intrabed quench is eliminated.

Hot effluent product from section 17 passes through line 18 into heat exchanger 4 where it gives up heat to incoming hydrocracking feed stock. The product stream then passes through line 38 into separator 31 where hydrogen-affording gases are removed for recycle to fresh hydrocracker feed and for use as cooling gas to the hydrocracking reaction sections. Product then passes through line 39 to separator 40 where gases are flashed off and removed from the system through line 41. Product leaving the bottom of separator 40 passes through line 42 into fractionator 43 having reboiler 55 where it is separated into various fractions as follows. Light ends are taken off the top through line 44, separated in separator 45 and sent to gas recovery by means of line 46. Butanes and heavier products comprising isomerized and hydrogenated naphtha and light hydrocracked naphtha are taken from the bottom of separator 45 through line 47. A portion of these materials is refluxed by means of pump 48 and line 49 and the remainder is removed from the system as product in line 50. Heavy hydrocracked naphtha product is taken off fractionator 43 through line 51 and distillate product is removed via line 52. Bottoms from the fractionator pass through line 53 and pump 54 and are recycled back to the hydrocracking section through line 56 along with fresh hydrocracker feed.

Based upon 6,000 barrels per stream day (b.s.d) of the above described pre-treated hydrocracker charge entering the system at 1 and 5,140 b.s.d. of the above described light olefinic naphtha charge stock entering the system at 20 with 4,000 b.s.d. of hydrocracked product being recycled through line 56 and 135 b.s.d. of olefin charge stock being added to the hydrocracking reaction sections in each of lines 24, 26, 27 and 28, the following yields are obtained:

| Feeds | B.s.d. | RM octane +3 cc. |
|---|---|---|
| Hydrocracker feed | 6,000 | |
| Isomerization-hydrogenation feed | 5,140 | 92 |
| Total | 11,140 | |

| Products | From cracking | | Isomerization-hydrogenation | | Total | |
|---|---|---|---|---|---|---|
| | B.s.d. | RM O.N. | B.s.d. | RM O.N. | B.s.d. | RM O.N. |
| Isobutane | 660 | | 510 | | 1,170 | |
| Normal butane | 480 | | 50 | | 530 | |
| Light naphtha | 1,860 | 99 | 4,680 | 101 | 6,540 | 100 |
| Heavy naphtha | 4,500 | | | | 4,500 | |
| Total | 7,500 | | 5,240 | | 12,740 | |

Having thus described the invention what is claimed is:

1. A combination hydrocracking and isomerization-hydrogenation refining process which comprises:
    (a) contacting a hydrocarbon feed in a hydrocracking zone at hydrocracking conditions with a hydrocracking catalyst in the presence of an excess of a hydrogen-affording gas to obtain a hydrogen-containing lower boiling effluent; and
    (b) converting a light olefin hydrocarbon feed to branched-chain paraffinic hydrocarbons by contacting an olefinic hydrocarbon feed containing a substantial quantity of normal olefins having from about 4 to about 10 carbon atoms per molecule at isomerization-hydrogenation conditions with an active composite isomerization-hydrogenation catalyst in an isomerization-hydrogenation zone in the presence of at least a portion of said hydrogen-containing hydrocarbon effluent from said hydrocracking zone, said olefin feed introduced into said isomerization-hydrogenation zone being at least about 10 volume percent of the hydrocarbons introduced thereinto.

2. A combination hydrocracking and isomerization-hydrogenation refining process which comprises:
    (a) contacting a hydrocarbon feed in a hydrocracking zone at hydrocracking conditions with a hydrocracking catalyst in the presence of an excess of hydrogen-affording gas to obtain a hydrogen-containing lower boiling effluent containing aromatic hydrocarbons; and (b) converting a light olefin hydrocarbon feed to branched-chain paraffinic hydrocarbon by contacting said olefin hydrocarbons at isomerization-hydrogenation conditions with an active composite isomerization-hydrogenation catalyst in an isomerization-hydrogenation zone in the presence of at least a portion of said hydrogen-containing effluent from said hydrocracking zone which effluent provides a minor amount, based upon olefin feed, of a polycyclic aromatic hydrocarbon effective to reduce formation of side reaction products in the isomerization-hydrogenation zone, said olefin feed introduced into said isomerization-hydrogenation zone being at least about 10 volume percent of the hydrocarbons introduced thereinto.

3. The process of claim 1 wherein said contacting in step (a) is carried out in the presence of about 0.3 to about 20 mole percent, based on feed, of olefinic hydrocarbons having about 3 to about 8 carbon atoms per molecule.

4. The process of claim 1 wherein said contacting in step (a) is carried out in the presence of a small amount of olefinic hydrocarbons having from about 3 to about 8 carbon atoms per molecule, said olefinic hydrocarbons being introduced into the hydrocracking zone at multiple injection points spaced to provide about 0.3 to about 20 mole percent of said olefin, based on feed, throughout a substantial portion of said hydrocracking zone.

5. The process of claim 1 wherein said hydrocracking zone and said isomerization-hydrogenation zone are contained in a single reactor.

6. The process of claim 1 wherein said hydrocracking catalyst and said isomerization-hydrogenation catalyst are the same.

7. A combination hydrocracking and isomerization-hydrogenation refining process which comprises:
 (a) contacting a hydrocarbon feed boiling in the range of about 350–850° F. in a hydrocracking zone with a hydrocracking catalyst in the presence of an excess of a hydrogen-affording gas at hydrocracking conditions said conditions including a temperature in the range of about 400–1000° F., a pressure in the range of about 200 to about 2000 p.s.i.g., a liquid hourly space velocity in the range of about 0.1 to 10 volumes of oil per hour per volume of catalyst and a hydrogen to hydrocarbon ratio in the range of about 1000 to 20,000 standard cubic feet of hydrogen per barrel of hydrocarbon to obtain a hydrogen and aromatics containing effluent; and
 (b) converting a minor amount, based upon hydrocarbon feed to said hydrocracking zone, of a straight-chain olefinic hydrocarbon feed containing a substantial amount of $C_4$–$C_6$ normal olefins to branched-chain paraffinic hydrocarbons by contacting said straight-chain olefinic hydrocarbon feed with an isomerization-hydrogenation catalyst in an isomerization-hydrogenation zone at isomerization-hydrogenation conditions which include a temperature in the range of about 400 to 750° F., a pressure in the range of about 100 to 2000 p.s.i.g., a space velocity in the range of about 0.1 to about 10 volumes of hydrocarbon per hour per volume of catalyst, said contacting further being in the presence of at least a portion of said effluent from said hydrocracking zone to provide at least 1500 s.c.f. of hydrogen-affording gas per barrel of olefin feed transferred to said isomerization-hydrogenation zone and from about 0.5 to about 40 volume percent, based on olefin feed, of polycyclic aromatic hydrocarbons effective to reduce formation of side reaction products, said olefin feed introduced into said isomerization-hydrogenation zone being at least about 10 volume percent of the hydrocarbons introduced thereinto.

8. The process of claim 7 wherein said contacting in step (a) is carried out in the presence of about 0.3 to about 20 mole percent, based on feed, of olefinic hydrocarbons having from 4 to 6 carbon atoms per molecule.

9. The process of claim 7 wherein said contacting in step (a) is carried out in the presence of a small amount of olefinic hydrocarbons having from 4 to 6 carbon atoms per molecule, said olefinic injection points spaced to provide about 0.3 to about 20 mole percent of said olefin, based on feed, throughout a substantial portion of said hydrocracking zone.

10. A combination hydrocracking and isomerization-hydrogenation refining process which comprises:
 (a) contacting a hydrocarbon feed stock boiling in the range of about 350–850° F. in a hydrocracking zone with a hydrocracking catalyst in the presence of an excess of a hydrogen-affording gas and about 0.3 to about 20 mole percent, based upon hydrocarbon feed, of olefinic hydrocarbons having from 4 to 6 carbon atoms per molecule under conditions including a temperature in the range of about 500–700° F., a pressure in the range of about 200 to about 2000 p.s.i.g., a liquid hourly space velocity in the range of about 0.1 to 10 volumes of oil per hour per volume of catalyst and a hydrogen to hydrocarbon ratio in the range of about 2000 to about 12,000 standard cubic feet of hydrogen per barrel of hydrocarbon to obtain a hydrogen and aromatics containing effluent;
 (b) transferring heat from said lower boiling product to a minor amount, based upon hydrocarbon feed to said hydrocracking zone, of a straight-chain olefinic hydrocarbon feed containing a substantial amount of $C_5$–$C_6$ normal olefins;
 (c) converting said straight-chain olefinic hydrocarbon feed to branched-chain paraffinic hydrocarbons by contacting said olefinic hydrocarbon feed with an isomerization-hydrogenation catalyst in an isomerization-hydrogenation zone in the presence of hydrogen at a temperature in the range of about 450 to 700° F., a pressure in the range of about 100 to 2000 p.s.i.g., and a space velocity in the range of about 0.1 to about 10 volumes of hydrocarbon per hour per volume of catalyst and in the presence of at least a portion of said effluent from said hydrocracking zone to provide at least 1500 standard cubic feet of hydrogen-affording gas per barrel of olefin feed, and from about 0.5 to about 40 volume percent, based upon olefin feed, of polycyclic aromatic hydrocarbons effective to reduce formation of side reaction products, said olefin feed introduced into said isomerization-hydrogenation zone being at least about 10 volume percent of the hydrocarbons introduced thereinto.
 (d) removing hydrogen-affording gas from the resulting hydrocracking and isomerization-hydrogenation product stream and recycling at least a portion of said gas to said hydrocracking zone;
 (e) fractionating said product in a fractionation zone to recover light and heavy naphtha fractions; and
 (f) withdrawing a bottom fraction from said fractionation zone and recycling at least a portion of said bottom fraction to said hydrocracking zone.

References Cited by the Examiner

UNITED STATES PATENTS

| | | | |
|---|---|---|---|
| 2,120,295 | 6/1938 | Pier et al. | 208—108 |
| 2,280,258 | 4/1942 | Pier | 208—108 |
| 2,971,900 | 2/1961 | Weekman | 208—59 |
| 3,159,564 | 12/1964 | Kelley et al. | 208—59 |

DELBERT E. GANTZ, *Primary Examiner.*

ALPHONSO D. SULLIVAN, PAUL M. COUGHLAN,
*Examiners.*